(12) United States Patent  
Byrne (10) Patent No.: US 7,565,940 B2
(45) Date of Patent: Jul. 28, 2009

(54) ORIFICE COVER

(75) Inventor: Gregory L. Byrne, Novi, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 410 days.

(21) Appl. No.: 11/297,066

(22) Filed: Dec. 8, 2005

(65) Prior Publication Data

US 2007/0131051 A1    Jun. 14, 2007

(51) Int. Cl.
 *B60K 23/00* (2006.01)
(52) U.S. Cl. .......................... 180/78; 74/492; 220/300; 280/775
(58) Field of Classification Search .................. 74/492, 74/493; 180/78, 90, 315, 334, 336; 280/775, 280/779; 220/293, 300, 345.1, 345.4, 351, 220/789; 49/463; 277/637, 641, 642; 296/1.08, 296/39.1
See application file for complete search history.

(56) References Cited

U.S. PATENT DOCUMENTS

| 3,912,110 | A | * | 10/1975 | Hammes ..................... 220/610 |
| 4,781,268 | A | * | 11/1988 | Richardson, Jr. ............ 180/287 |
| 4,991,457 | A | * | 2/1991 | Chen ........................ 74/473.36 |
| 5,224,624 | A | * | 7/1993 | Kraus ......................... 220/201 |
| 6,250,494 | B1 | * | 6/2001 | Diamond .................... 220/783 |
| 6,578,449 | B1 | * | 6/2003 | Anspaugh et al. ......... 74/606 R |
| 2004/0154429 | A1 | * | 8/2004 | Rhea et al. .................... 74/558 |

* cited by examiner

*Primary Examiner*—Paul N. Dickson
*Assistant Examiner*—Robert A. Coker
(74) *Attorney, Agent, or Firm*—Young Basile (57) ABSTRACT

An orifice cover is described that is selectively disposed within an orifice having a structural member adapted to extend through the orifice. The orifice includes an inner peripheral extent and both an inner surface and an outer surface. The orifice cover further includes an elastomeric main body having an outer periphery. The outer periphery selectively engages the inner peripheral extent of the orifice and the outer periphery includes a securing mechanism for securing the orifice cover to the orifice.

18 Claims, 8 Drawing Sheets

ORIFICE COVER

TECHNICAL FIELD

The embodiments described herein are generally directed to a cover for an orifice.

BACKGROUND

Motor vehicles are provided with steering systems including a steering column that upwardly extends into the passenger compartment where it is interconnected with a steering wheel. To accommodate varying physical attributes and driver comfort preferences, the steering systems of modern vehicles are also equipped with a mechanism that permits the steering wheel to be adjusted upwardly or downwardly. Such a feature, which is commonly referred to as "tilt steering", also facilitates driver entry into and exit from the vehicle.

A locking mechanism is provided for retaining the steering column in an adjusted position. The locking mechanism must be released to adjust the steering column. Typically, the locking mechanism is released by actuation of a lever by a hand of the driver. Usually this involves a rearward movement of the lever by the left hand.

However, all known arrangements are associated with disadvantages. Most significantly, known arrangements for facilitating vertical adjustment of a steering wheel expose the steering column or otherwise provide an undesirable visual impression when the steering wheel is downwardly pivoted to its lowered position. Consumer purchasing decisions and owner satisfaction are significantly affected by vehicle styling, including interior styling. As with the vehicle exterior, interior vehicle designs often seek an uninterrupted visual impression. Heretofore, the steering arrangements for motor vehicles have frequently been unable to attain such a visual impression with a tilt steering application.

Figure 1:
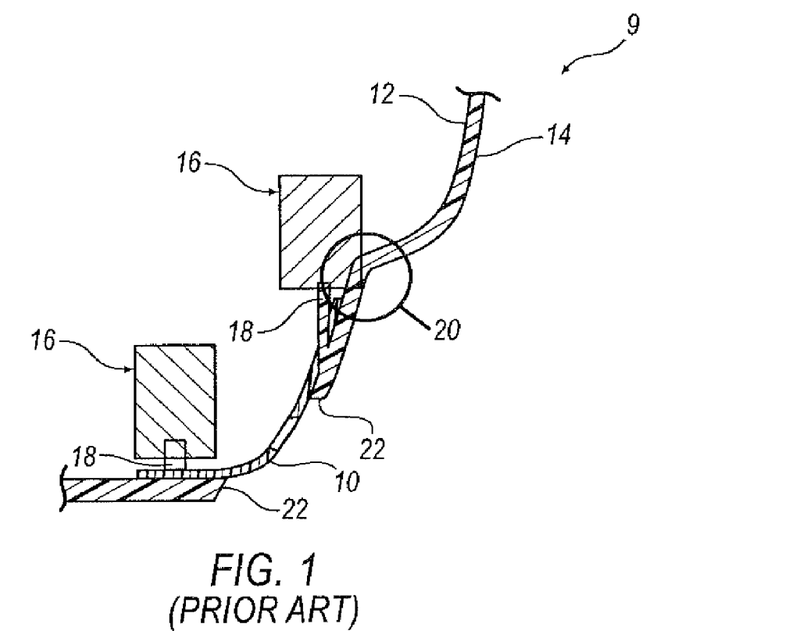
FIG. 1 is a cross-section view of a steering column assembly showing a prior art method of securing a cover by applying a heat stake tool from an upper position.
Figure 2:
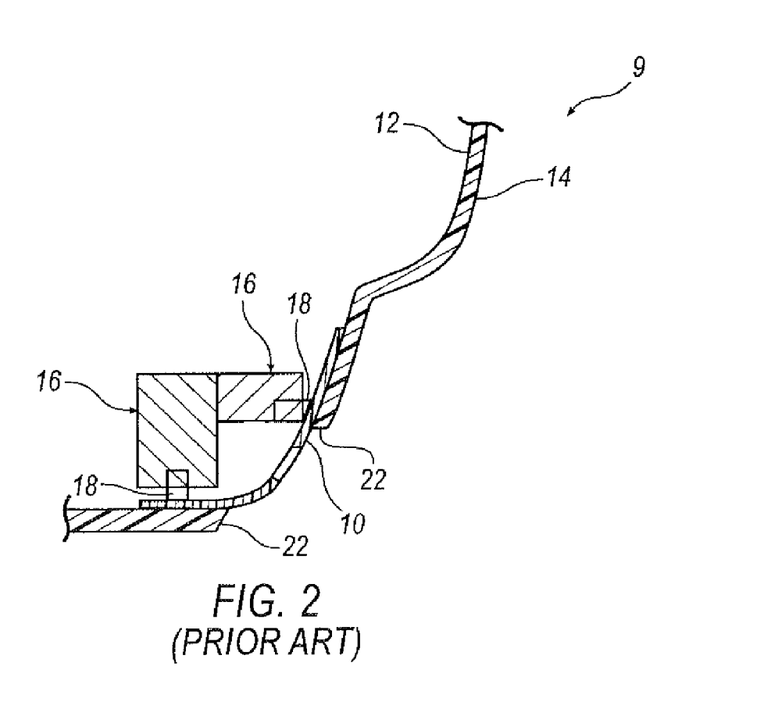
FIG. 2 is a cross-sectional view of the steering column assembly of FIG. 1 showing the heat stake tool applied in both an upper position and a side position.
Figure 3:
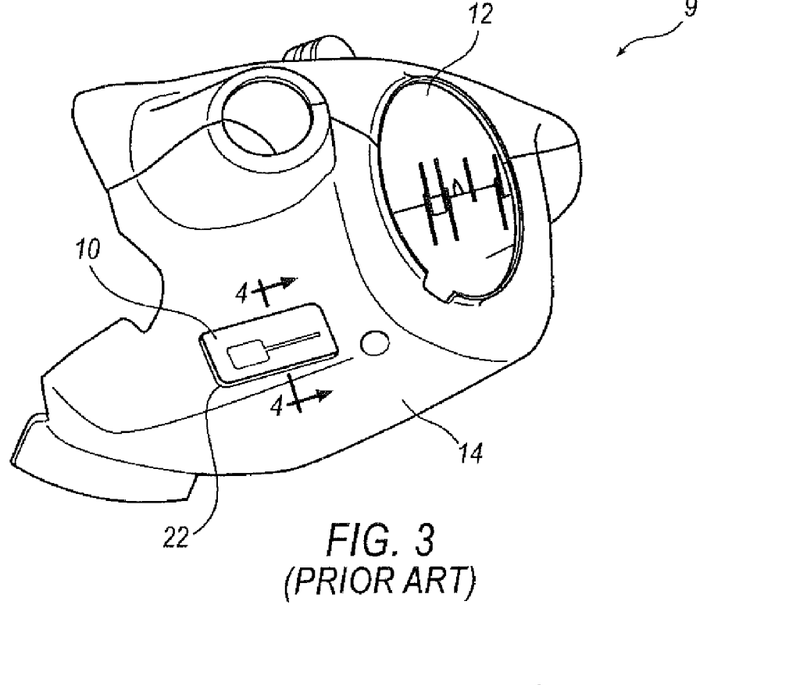
FIG. 3 is an elevational perspective view of the steering column assembly of FIG. 1 showing a cover disposed within the assembly.
Figure 4:
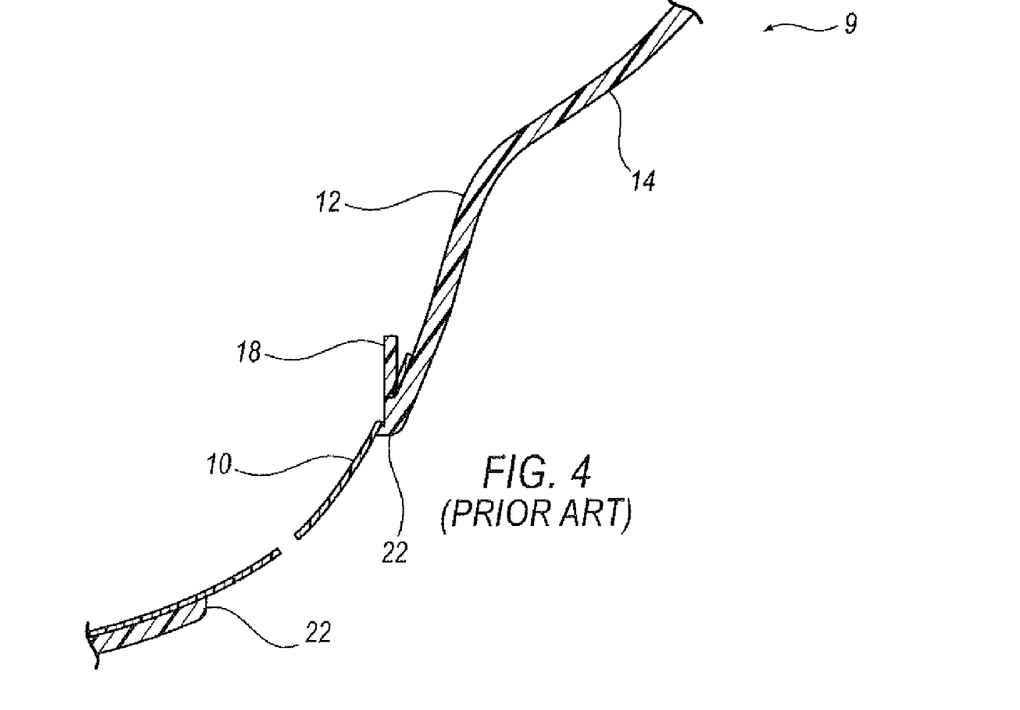
FIG. 4 is a cross-sectional view taken along section line 4-4 of FIG. 3 showing the cover on an inner surface of a steering column sidewall.

Referring now to FIGS. 1-7, prior art methods of attaching a cover inside a steering column assembly 9 are shown. FIGS. 1 and 2 show a method of heat staking a cover 10 to an inner surface 12 of a steering column sidewall 14 using a heat stake tool 16. The cover 10 is secured to the steering column sidewall 14 by having heat stake tools 16 melt plastic heads 18 forming a bond between the plastic head 18 and the steering column sidewall 14. The process including melting the heads 18 to the cover 10 using heat stake tools 16 at either an upper orientation as shown in FIG. 1 or a combination of an upper and a side orientation as shown in FIG. 2. This process also potentially melts the steering column sidewall 14 at a burn area 20 as a result of interference between the heat stake tool 16 and the steering column sidewall 14. Furthermore, having the heat stake tool 16 melt the head 18 from two orientations as shown in FIG. 2 further complicates the securement of the cover 10 and increases manufacturing costs. The steering column assembly 9 is required to have an aesthetically pleasing design while providing a functional component. As a result, there is not enough clearance for the heat stake tools 16. Furthermore, the cover 10 does not provide an uninterrupted visual impression because the cover 10 is disposed on the inner surface 12 of the steering column sidewall 14 thereby exposing edges 22.

Figure 5:
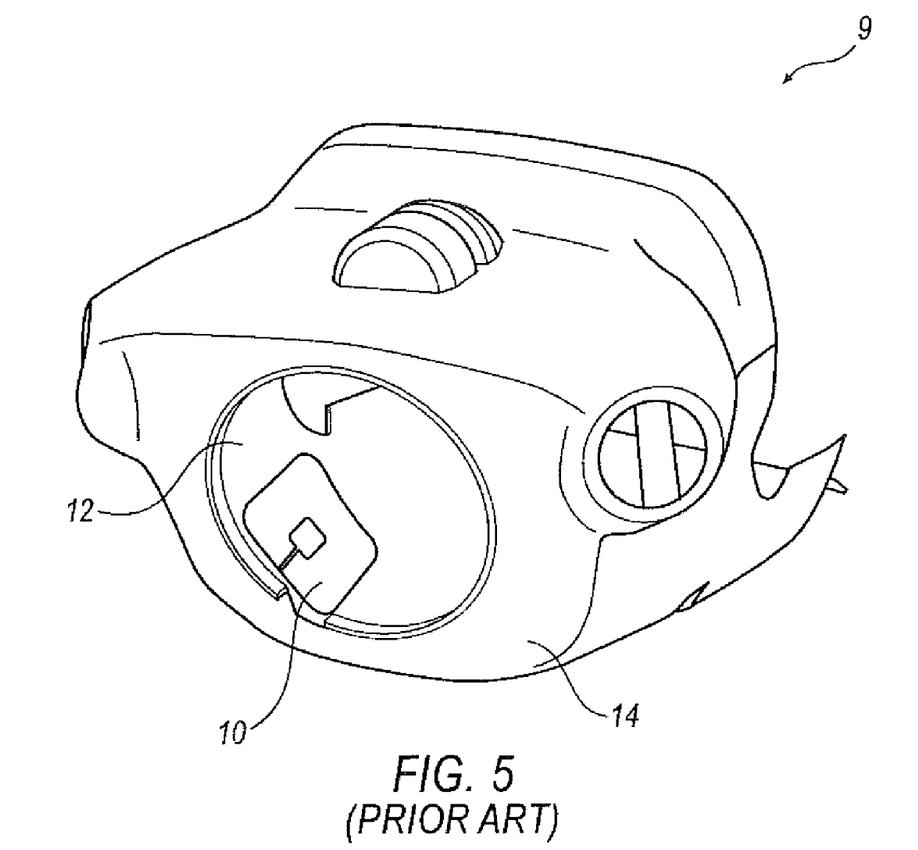
FIG. 5 is an elevational perspective view of a second prior art method of securing cover to a steering column assembly by adhering the cover to the inner surface of the assembly.
Figure 6:
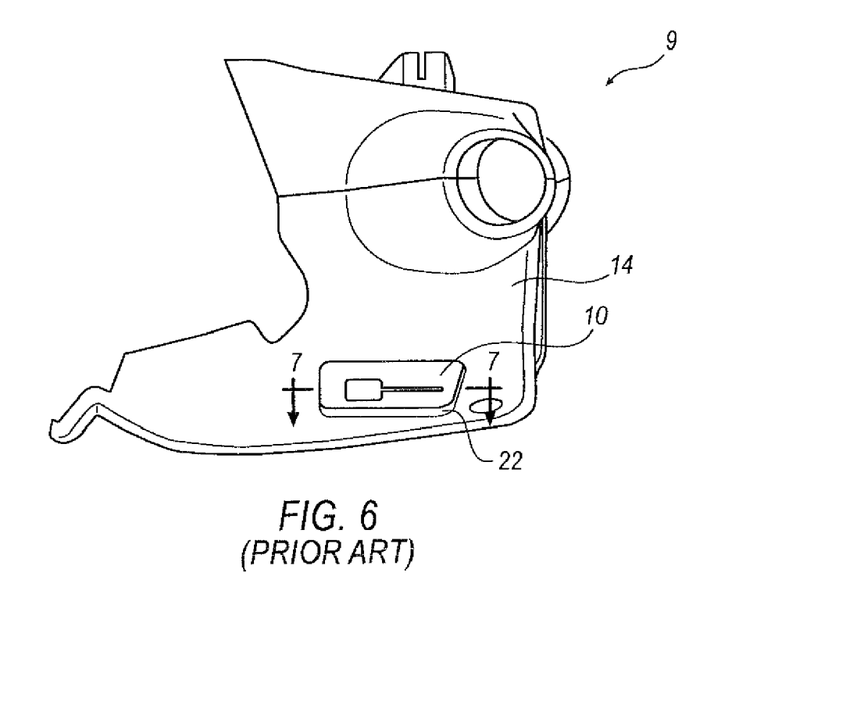
FIG. 6 is a side elevational view of the steering column assembly of FIG. 5.
Figure 7:
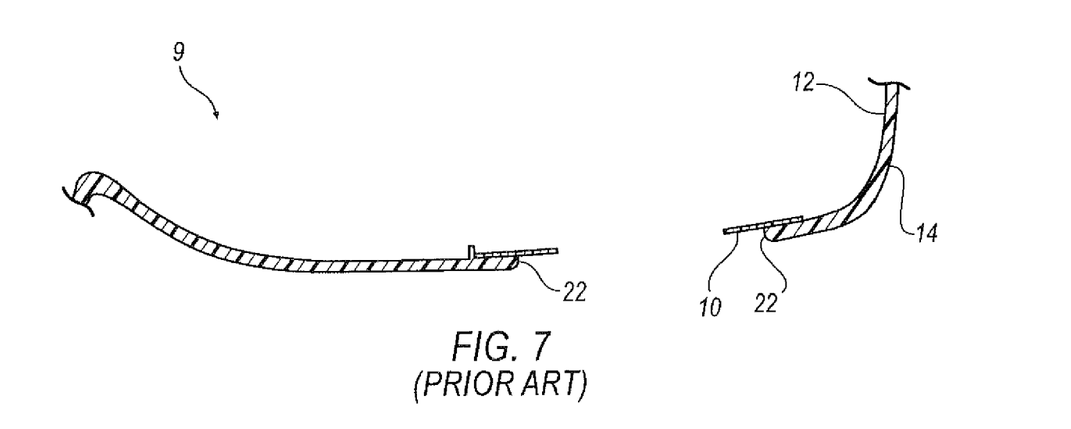
FIG. 7 is a cross-sectional view taken along section line 7-7 in FIG. 6.

Another method of securing the cover 10 to the steering column sidewall 14 is shown in FIGS. 5-7 having the cover adhered to the inner surface 12 of the steering column sidewall 14. Typically, tape is used to secure the cover 10 to the inner surface 12. The problem with this method is that the tape usually loses adhesion and the cover becomes unsecured. Furthermore, the cover 10 does not provide an uninterrupted visual impression because the cover 10 is disposed on the inner surface 12 of the steering column sidewall 14 thereby exposing edges 22.

Accordingly, there is a need to provide a steering arrangement for a motor vehicle which permits the steering wheel to be vertically adjusted without exposing the steering column and provides a generally uninterrupted visual impression. Specifically, it is desired to provide a cover for an orifice that provides the generally uninterrupted visual impression while properly securing the cover to the steering column sidewall.

SUMMARY

In the embodiments and methods described, an orifice cover is employed that is selectively disposed within an orifice having a structural member adapted to extend through the orifice. The orifice includes an inner peripheral extent and both an inner surface and an outer surface. The orifice cover further includes an elastomeric main body having an outer periphery. The outer periphery selectively engages the inner peripheral extent of the orifice and the outer periphery includes a securing mechanism for securing the orifice cover to the orifice.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

The term "orifice" as used throughout the specification is defined hereinafter to include but is not limited to: an opening, especially to a cavity or passage of a body. The term "opening" as used throughout the specification is defined hereinafter to include but is not limited to: an unobstructed entrance or exit; not shut or closed; an unobstructed passage or view; a space; and a gap. The term "elastomeric" as used throughout the specification is defined hereinafter to include but is not limited to: any of various polymers having the elastic properties of natural rubber; elastic; a flexible stretchable fabric made with interwoven strands of rubber or an imitative synthetic fiber; and a flexible material of any kind including plastic. The term "secure" or any variation thereof such as "securing" as used throughout the specification is defined hereinafter to include but is not limited to: to make firm or tight; fasten; hold; to clasp or link firmly; and to fix in place so that movement is minimized.

Figure 8:
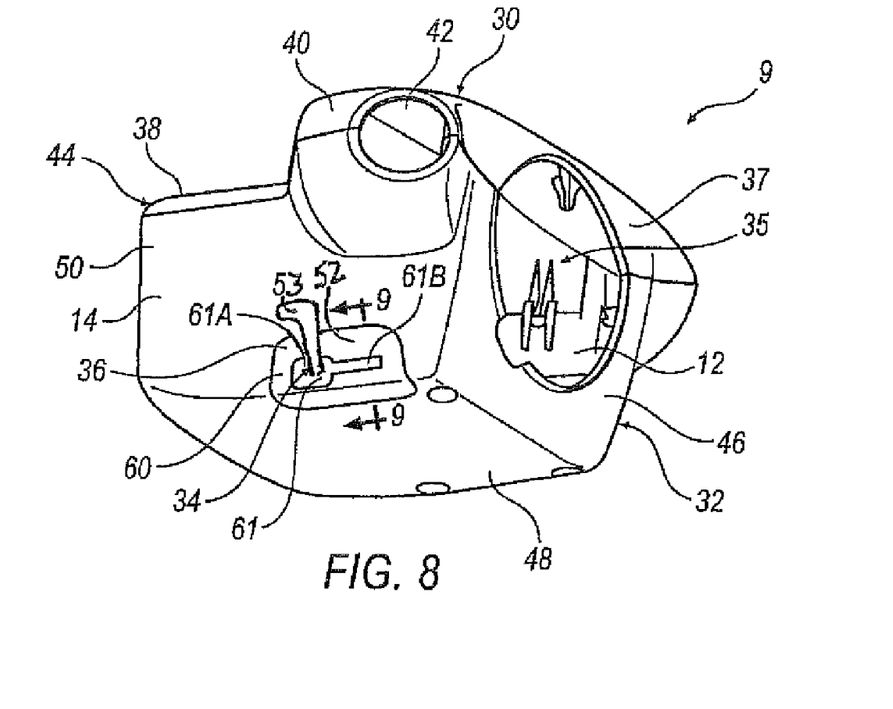
FIG. 8 is an elevational perspective view of one embodiment of an orifice cover shown in a steering column assembly.
Figure 9:
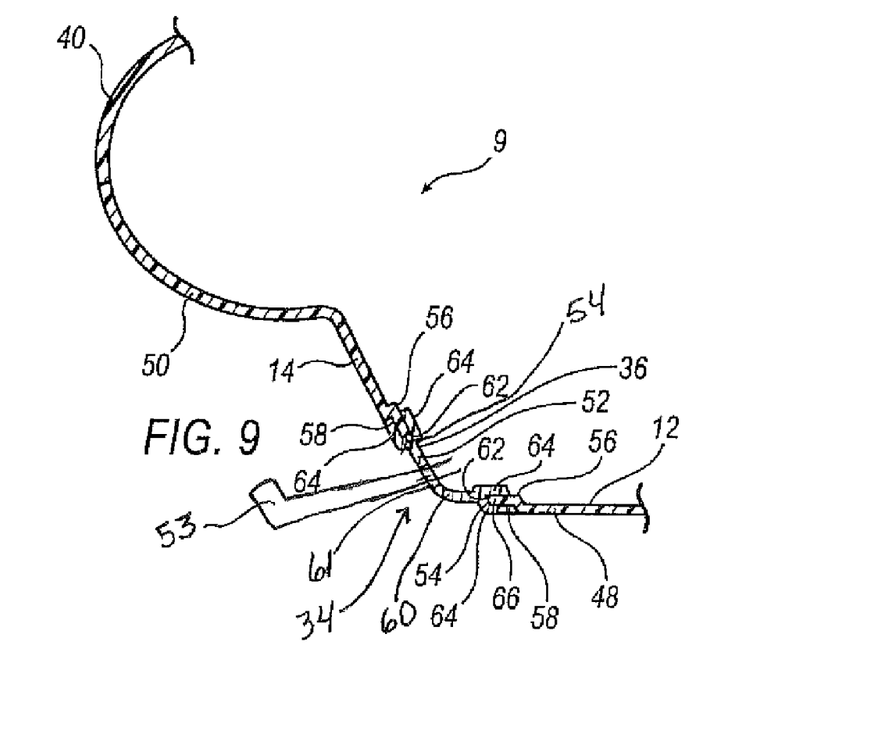
FIG. 9 is a cross-sectional view of the orifice cover taken along section line 9-9 of FIG. 8.
Figure 10:
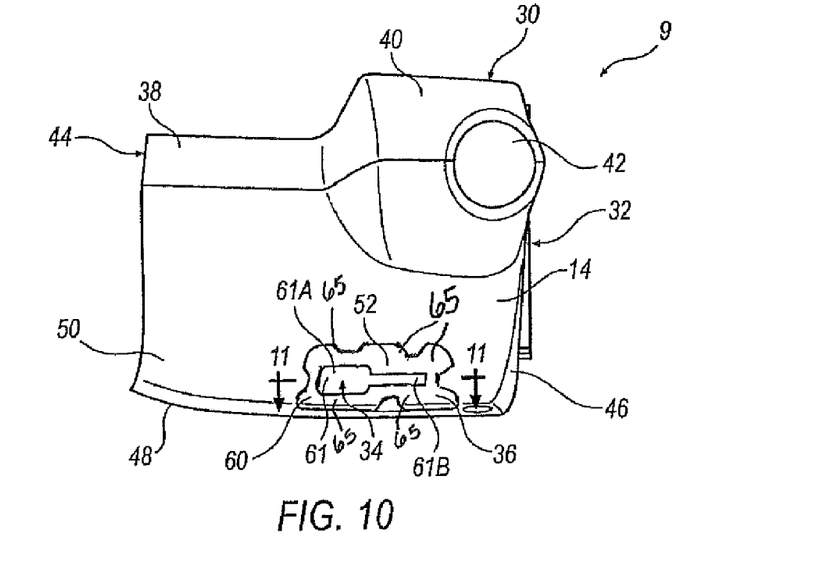
FIG. 10 is a side elevational view of the orifice cover of FIG. 8 shown in the steering column assembly.

As illustrated in FIG. 8, a vehicle component, here a steering column assembly 9 is oriented to extend into the passenger compartment of a motor vehicle (not shown) having an upper portion 30 and a lower portion 32. The steering column assembly 9 typically includes a protrusion such as tilt mechanism 53 extending outwardly from an opening (orifice) 34, and further includes a steering column end (not shown), which extends from a first opening 35 for engaging a steering wheel (not shown). The tilt mechanism 53 includes a manually actuated lever extending from the steering column assembly 9 at opening 34 permitting the steering wheel to be adjusted between a raised position and a lowered position. The opening 34 is generally covered with an orifice cover 36 as further described below.

The upper portion 30 is integrally formed of plastic or any other suitable material to include a front panel 37, an upper wall 38 and a pair of laterally rounded side walls 40. In the embodiment illustrated, the upper wall 38 extends rearwardly. The laterally rounded side walls 40 are formed similarly to include a generally rounded cutaway portion 42 for operatively receiving a control handle (not shown) as it laterally extends from the steering column. A rear boundary 44 of the upper portion 30 is contoured to follow the mating contour of a vehicle instrument panel (not shown).

The lower portion 32 of the steering column assembly 9 is also formed from plastic or other suitable material and similarly includes a front panel 46, a bottom wall 48 and a pair of laterally opposed side walls 50. The lower portion 32 is secured or otherwise coupled to the steering column assembly 9 through a conventional securing means. The front panels 37 and 46 of the upper and lower portions 30 and 32 of the steering column assembly 9 are configured to cooperatively define the first opening 35 through which the steering column extends for engagement with the steering wheel.

Referring now to FIGS. 8-14, a first embodiment of the orifice cover 36 is shown. The orifice cover 36 is selectively disposed within the opening 34 having a structural member 52 adapted to extend through the opening 34. Structural member 52 is a portion of orifice cover 36 that is adapted to be at least partially disposed within opening 34. The opening 34 is defined by an inner peripheral extent 54 and both an inner surface 56 and an outer surface 58. The orifice cover 36 includes an elastomeric main body 60 having an outer periphery 62. The elastomeric main body 60 includes an opening 61 therethrough that is spaced inwardly of the outer periphery 62. The opening 61 is adapted to provide travel between a first position 61A and a second position 61B of the protrusion, such as tilt mechanism 53. The outer periphery 62 selectively engages the inner peripheral extent 54 of the opening 34. The outer periphery 62 further includes a securing mechanism 64 for securing the orifice cover 36 to the opening 34. In one embodiment, the securing mechanism 64 may include a channel 66. In another embodiment, the securing mechanism 64 may include a plurality of tabs 65 shown in FIG. 10.

Figure 11:
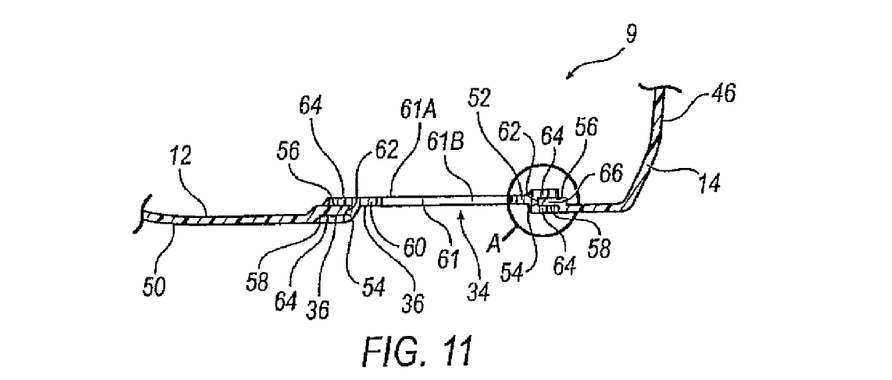
FIG. 11 is a cross-sectional view of the orifice cover taken along section line 11-11 of FIG. 10.
Figure 11A:
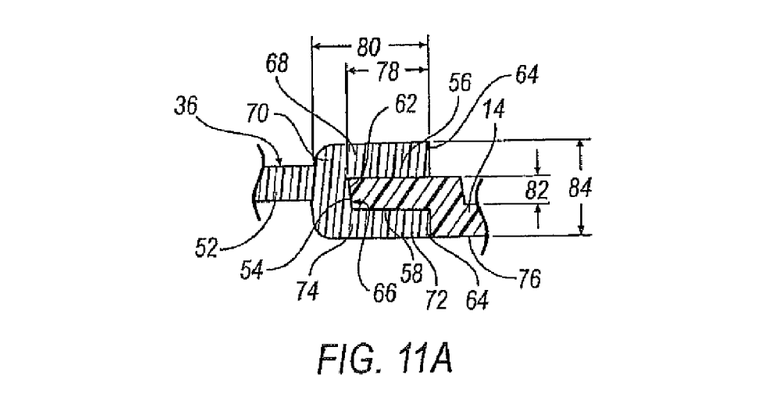
FIG. 11A is a partial sectional view of the orifice cover of FIG. 11 showing one embodiment of a securing mechanism.
Figures 12, 13:
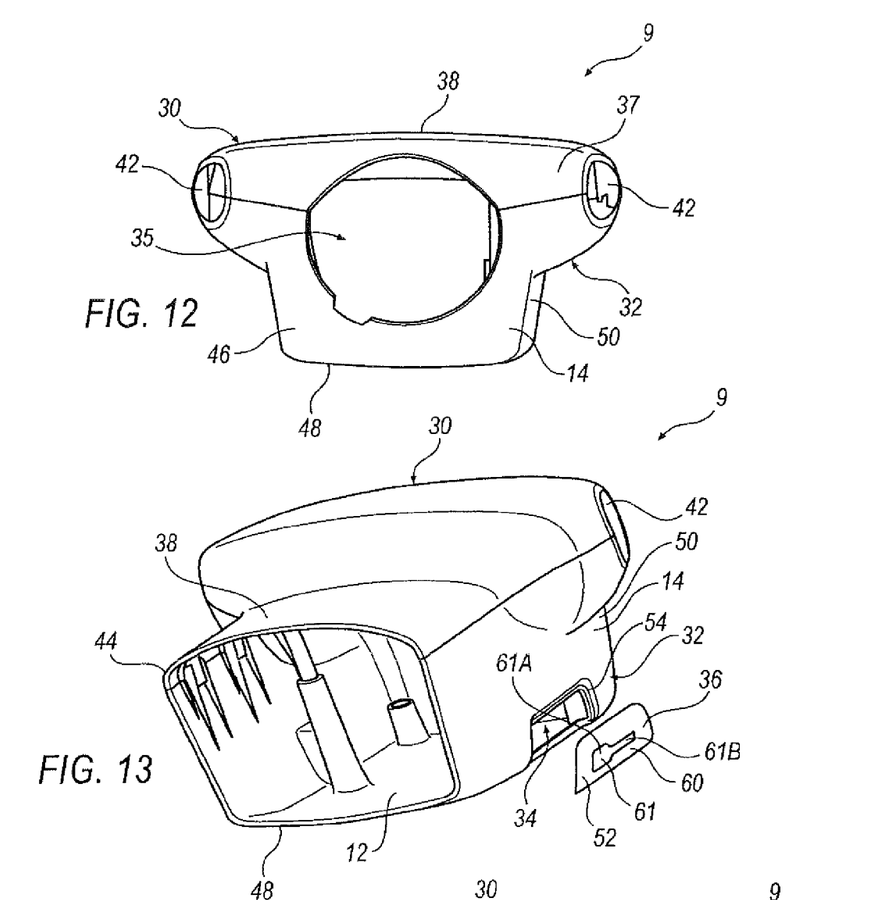
FIG. 12 is a front elevational view of the steering column assembly of FIG. 8.
FIG. 13 is an elevational perspective view of the orifice cover and the steering column assembly of FIG. 8 in a pre-assembled orientation.
Figure 14:
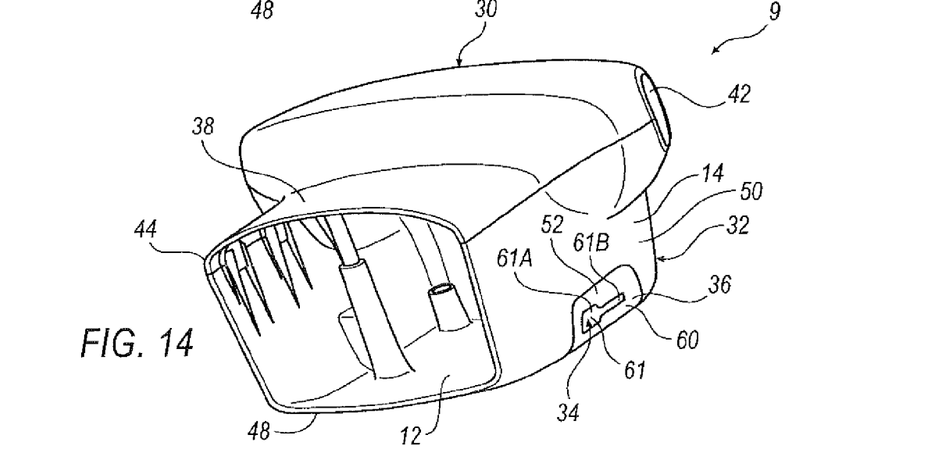
FIG. 14 is an elevational perspective view of the orifice cover and the steering column assembly of FIG. 8 in an assembled orientation.

However, any securing mechanism for securing the orifice cover 36 to the opening 34 is contemplated where the outer periphery 62 selectively engages the inner peripheral extent 54 of the opening 34. In one embodiment, the securing mechanism 64 is a channel 66 as shown in FIG. 11A, an upper securement portion 68 extending radially outwardly from an upper portion 70 of orifice cover 36 at the outer periphery 62 and a lower securement portion 72 extending radially outwardly from a lower portion 74 of the orifice cover 36 at the outer periphery 62. The lower securement portion 72 may be adapted to be generally flush with an outer surface 76 of the steering column assembly 9. Stated another way, the upper securement portion 68 is disposed proximate the inner surface 56 of the opening 34 and at least partially disposed around the elastomeric body 60 extending away from the outer periphery 62. The lower securement portion 72 is disposed proximate the outer surface 58 of the opening 34 and at least partially disposed around the elastomeric body 60 extending away from the outer periphery 62.

The upper and lower securement portions 68 and 72 of the orifice cover 36 include an engagement length 78 and an overall length 80. The channel 66 between the upper securement portion 68 and lower securement portion 72 includes a channel thickness 82. An overall thickness 84 includes the channel thickness 82 and the thickness of the upper and lower securement portions 68 and 72. By way of example, in one embodiment, the channel thickness 82 to the overall thickness 84 is within 40 percent to 45 percent. The channel thickness is between 2.0 mm to 3.0 mm and the thickness of each securement portion 68, 72 is between 1.75 mm to 2.75 mm. The overall length 80 is at least 5 mm longer than the engagement length 78 having a ratio of greater than 70 percent. However, other ratios and length may also be used.

Figure 15:
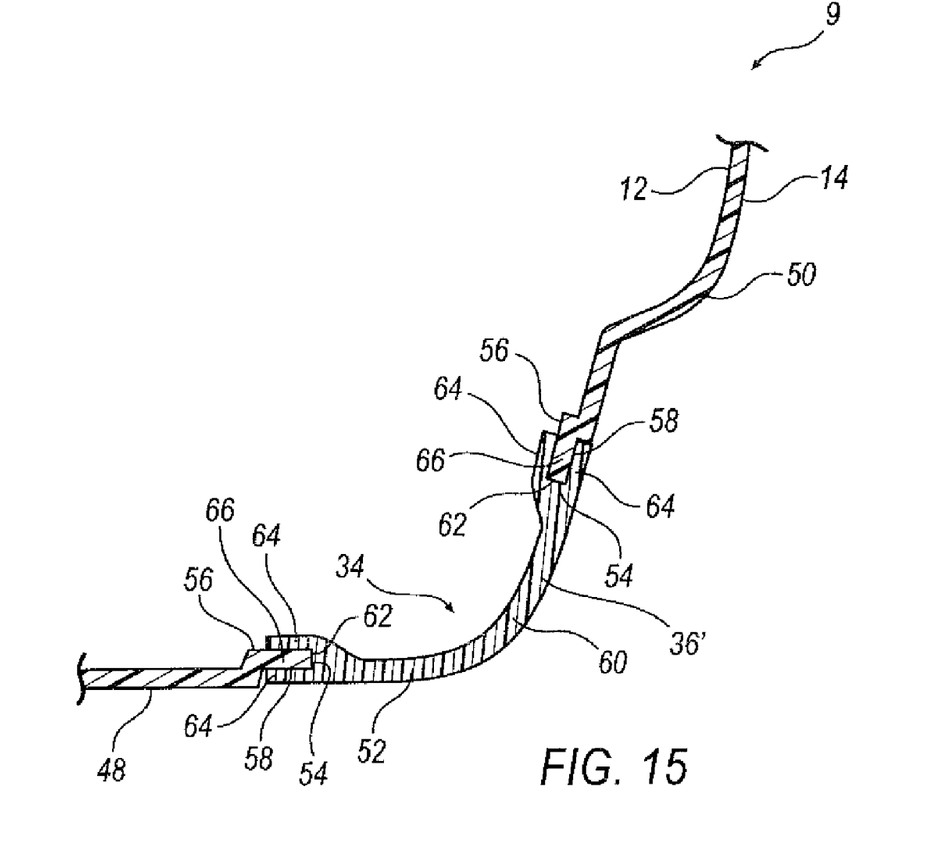
FIG. 15 is a second embodiment of an orifice cover not having an opening.

In another embodiment, the securing mechanism 64 includes a plurality of tabs, 65 an upper securement portion 68 extends radially outwardly from the upper portion 70 of the orifice cover 36 at the outer periphery 62 and the plurality of tabs 65 extend outwardly from the lower portion 74 of the orifice cover 36 at the outer periphery 62. In yet another embodiment as shown in FIG. 15, an orifice cover 36' omits the opening 34.

The innovative orifice cover 36, 36' provides a more robust cover than prior art covers by being formed from an elastomeric material such as plastic, rubber and the like, thereby providing greater strength and securement to the steering column assembly 9. The orifice cover 36, 36' is easier to maintain because heat stake tools are not required to replace the cover 36, 36 and it doesn't become unsecured in the manner of prior art covers that are taped to the steering column assembly 9. Any heat deflection of the cover 36, 36' is also reduced by providing the cover 36, 36' with a predetermined thickness minimizing any deformation or deflection that may result from heat when the vehicle is left in the sun. By way of example, the operating environment will meet Nissan specifications and basic operating temperatures between −30 degrees Celsius to 80 degrees Celsius. The orifice cover 36 testing cycles meet a minimum of 7,200 cycles at the specified temperatures.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An orifice cover selectively disposed within an orifice having a structural member selectively extending through the orifice, the orifice defined by an inner peripheral extent of a component opening, the component having both an inward facing surface and an outward facing surface, said orifice cover comprising:
    an elastomeric main body having an outer surface, an inner surface and an outer edge contacting the outer and inner surfaces, the outer edge defining an outer periphery, said outer periphery selectively engaging the inner peripheral extent of the component; and
    said outer periphery including a securing mechanism configured to contact both the inward facing surface and the outward facing surface of the component adjacent the component opening to secure said orifice cover to the component wherein said elastomeric main body includes an opening therethrough that is spaced inwardly of said outer periphery and wherein said opening selectively provides a travel pathway between a first position and a second position for a protrusion extending through said opening.

2. An orifice cover selectively disposed within an orifice having a structural member selectively extending through the orifice, the orifice defined by an inner peripheral extent of a component opening, the component having both an inward facing surface and an outward facing surface, said orifice cover comprising:
    an elastomeric main body having an outer surface, an inner surface and an outer edge contacting the outer and inner surfaces, the outer edge defining an outer periphery, said outer periphery selectively engaging the inner peripheral extent of the component;
    said outer periphery including a securing mechanism to secure said orifice cover to the component;
    wherein said securing mechanism includes a channel having a base at the outer periphery with sides of the channel extending outwardly therefrom, and said elastomeric main body includes an opening therethrough that is spaced inwardly of said outer periphery, and wherein said opening selectively provides a travel pathway between a first position and a second position for a protrusion extending through said opening.

3. The orifice cover of claim 2, wherein said channel is defined by an upper securement portion that extends radially outwardly from the inner surface of said orifice cover at said outer periphery and a lower securement portion that extends radially outwardly from the outer surface of said orifice cover at said outer periphery.

4. The orifice cover of claim 3, wherein said lower securement portion is selectively generally flush with the outward facing surface of the component.

5. An orifice cover selectively disposed within an orifice having a structural member selectively extending through the orifice, the orifice defined by an inner peripheral extent and both an inward facing surface and an outward facing surface of a component, said orifice cover comprising:
    an elastomeric main body having an outer periphery, said outer periphery selectively engaging the inner peripheral extent of the component;
    said outer periphery including a securing mechanism to secure said orifice cover to the component;
    wherein said securing mechanism includes a plurality of tabs and said elastomeric main body includes an opening therethrough that is spaced inwardly of said outer periphery and wherein said opening selectively provides a travel pathway between a first position and a second position for a protrusion extending through said opening.

6. The orifice cover of claim 5, wherein said plurality of tabs include an upper securement portion that extends radially outwardly from an upper portion of said orifice cover at said outer periphery and said plurality of tabs extend outwardly from a lower portion of said orifice cover at said outer periphery.

7. The orifice cover of claim 6, wherein said lower securement portion is selectively generally flush with the outward facing surface of the component.

8. An orifice cover of a component adapted to be secured to the component, the orifice defined by an inner peripheral extent including an inward facing surface and an outward facing surface of the component the orifice cover comprising:
    an elastomeric body having an outer periphery disposed within the inner peripheral extent of the component;
    an upper securement portion disposed proximate the inward facing surface of the component and at least partially disposed around said elastomeric body extending away from said outer periphery; and
    a lower securement portion disposed proximate the outward facing surface of the component and at least partially disposed around said elastomeric body extending away from said outer periphery, wherein said elastomeric body includes an opening therethrough that is spaced inwardly of said outer periphery and wherein said opening selectively provides a travel pathway between a first position and a second position for a protrusion extending through said opening.

9. The orifice cover of claim 8, wherein said lower securement portion is generally flush with the outer surface of the component.

10. The orifice cover of claim 8, wherein the opening with respect to the component is stationary as the protrusion travels between the first and second positions.

11. The orifice cover of claim 8, wherein the elastomeric body between the outer periphery and the opening that is spaced inwardly of the outer periphery cooperates with the outward facing surface of the component to form a generally planar surface.

12. An orifice cover selectively disposed within an orifice having a structural member adapted to extend through the orifice, the orifice defined by an inner peripheral extent and both an inward facing surface and an outward facing surface of a component, said orifice cover comprising:
   an elastomeric main body having an outer periphery, said outer periphery selectively engaging the inner peripheral extent of the component; and
   a securing means configured to contact both the inward facing surface and the outward facing surface of the component to secure said orifice cover to the component wherein said elastomeric main body includes an opening therethrough that is spaced inwardly of said outer periphery and wherein said opening provides a travel pathway between a first position and a second position for a protrusion extending through said opening.

13. The orifice cover of claim 12, wherein the opening with respect to the component is stationary as the protrusion travels between the first and second positions.

14. The orifice cover of claim 12, wherein the elastomeric main body between the outer periphery and the opening that is spaced inwardly of the outer periphery cooperates with the outward facing surface of the component to form a generally planar surface.

15. An orifice cover selectively disposed within an orifice having a structural member adapted to extend though the orifice, the orifice defined by an inner peripheral extent and both an inward facing surface and an outward facing surface of a component, said orifice cover comprising:
   an elastomeric main body having an outer periphery, said outer periphery selectively engaging the inner peripheral extent of the component; and
   a securing means to secure said orifice cover to the component;
   wherein said securing means includes a channel and said elastomeric main body includes an opening therethrough that is spaced inwardly of said outer periphery, and wherein said opening provides a travel pathway between a first position and a second position for a protrusion extending though said opening.

16. The orifice cover of claim 15, wherein the opening with respect to the component is stationary as the protrusion travels between the first and second positions.

17. The orifice cover of claim 15, wherein the elastomeric main body between the outer periphery and the opening that is spaced inwardly of the outer periphery cooperates with the outward facing surface of the component to form a generally planar surface.

18. An orifice cover selectively disposed within an orifice having a structural member adapted to extend through the orifice, the orifice defined by an inner peripheral extent and both an inward facing surface and an outward facing surface of a component, said orifice cover comprising:
   an elastomeric main body having an outer periphery, said outer periphery selectively engaging the inner peripheral extent of the component; and
   a securing means to secure said orifice cover to the component;
   wherein said securing means includes a plurality of tabs and said elastomeric main body includes an opening therethrough that is spaced inwardly of said outer periphery, and wherein said opening provides a travel pathway between a first position and a second position for a protrusion extending through said opening.

* * * * *